(12) United States Patent
Kim et al.

(10) Patent No.: US 11,767,051 B2
(45) Date of Patent: Sep. 26, 2023

(54) STEERING COLUMN FOR AUTOMOTIVE

(71) Applicant: HL MANDO CORPORATION, Gyeonggi-do (KR)

(72) Inventors: Jong Han Kim, Gyeonggi-do (KR); Sang Hyun Park, Gyeonggi-do (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 17/734,043

(22) Filed: Apr. 30, 2022

(65) Prior Publication Data

US 2023/0103254 A1 Mar. 30, 2023

(30) Foreign Application Priority Data

Sep. 30, 2021 (KR) ........................ 10-2021-0129420
Dec. 24, 2021 (KR) ........................ 10-2021-0187843

(51) Int. Cl.
*B62D 1/185* (2006.01)
*B62D 1/19* (2006.01)
*B62D 1/181* (2006.01)

(52) U.S. Cl.
CPC ............. *B62D 1/185* (2013.01); *B62D 1/181* (2013.01); *B62D 1/192* (2013.01)

(58) Field of Classification Search
CPC ......... B62D 1/185; B62D 1/181; B62D 1/192
See application file for complete search history.

(56) References Cited

U.S. PATENT DOCUMENTS

| 2008/0047382 A1* | 2/2008 | Tomaru ............... F16H 25/2009 74/493 |
| 2015/0232117 A1* | 8/2015 | Stinebring ............. B62D 1/181 74/493 |
| 2019/0126968 A1* | 5/2019 | Messing ................ B62D 1/181 |
| 2021/0309277 A1* | 10/2021 | Huber ................. F16H 25/2025 |

FOREIGN PATENT DOCUMENTS

| DE | 10 2016 002 471 | 9/2016 | |
| DE | 10 2016 200 649 | 7/2017 | |
| DE | 102018212696 B3 * | 11/2019 | ............. B62D 1/181 |
| DE | 11 2019 004 741 | 6/2021 | |
| EP | 3650311 A1 * | 5/2020 | ........... B60R 21/203 |
| KR | 10-2020-0070086 | 6/2020 | |
| WO | WO-2007102558 A1 * | 9/2007 | ............. B62D 1/181 |
| WO | WO-2015190301 A1 * | 12/2015 | ......... B60R 16/0231 |

OTHER PUBLICATIONS

Office Action dated Dec. 9, 2022 for German Patent Application No. 10 2022 203 917.3 and its English machine translation by Google Translate.

* cited by examiner

*Primary Examiner* — Drew J Brown
(74) *Attorney, Agent, or Firm* — Ladas & Parry, LLP

(57) ABSTRACT

According to various example embodiments, there is provided a steering column for an automotive vehicle including, an inner tube 100 surrounding a steering shaft 120, an outer tube 110 into which the inner tube 100 is inserted, a nut screw 230 mounted on the outside of the outer tube 110 and fixed to the inner tube 100, and a first lead screw 210 which is inserted into the nut screw 230 and screwed therein and is rotated by a motor. In the steering column for the automotive vehicle, the nut screw 230 and the inner tube 100 are transferred together by translational motion by rotation of the first lead screw 210.

12 Claims, 9 Drawing Sheets

STEERING COLUMN FOR AUTOMOTIVE

CROSS-REFERENCE TO RELATED APPLICATIONS

The present application claims the priority to Korean Patent Application No. 10-2021-0129420 filed in the Korean Intellectual Property Office on Sep. 30, 2021 and Korean Patent Application No. 10-2021-0187843 filed in the Korean Intellectual Property Office on Dec. 24, 2021, the entire contents of which are incorporated herein by reference.

BACKGROUND

1. Field of the Invention

One or more example embodiments relate to a steering column for an automotive vehicle, and more particularly, to a steering column for an automotive vehicle capable of absorbing crash energy when the automotive vehicle crashes.

2. Description of the Related Art

In general, a steering system for an automotive vehicle is a device provided in the automotive vehicle so that a driver may turn the automotive vehicle in a desired direction by manipulating a steering wheel provided in the driver's seat.

The steering system for the automotive vehicle is configured to include the steering wheel provided in the driver's seat of the automotive vehicle, a steering shaft connected to a lower portion of the steering wheel, a steering column fixed to a vehicle body through a pair of mounting brackets with the steering shaft installed inside, a gearbox installed to intersect the steering shaft through a universal joint at a lower end of the steering shaft, and the like, to transmit a rotational force of the steering shaft in a state inclined at a certain angle.

The steering column includes telescope and tilt functions. Through these functions, the driver may adjust a degree of protrusion and an inclination angle of the steering wheel to suit his/her height or body type, thereby enabling smooth steering operations.

The steering shaft is provided with various energy absorbing structures so that it may be contracted in an axial direction when an external impact energy is transmitted, and the steering column installed outside the steering shaft is also contractible in the axial direction therewith.

In other words, the steering column normally maintains an assembled state and is contracted in the axial direction to serve as a buffer when the external impact energy is transmitted, thereby preventing the steering system from protruding toward the driver by an impact force and harming the driver when the automotive vehicle crashes. Further, when the driver bumps into the steering system due to crash inertia, it absorbs and mitigates the impact force to minimize the driver's injury.

The steering column includes an outer tube and an inner tube each formed of a hollow tube to absorb an impact energy. One end of the inner tube having a smaller diameter than the outer tube is inserted into one end of the outer tube facing it.

An impact energy absorbing mechanism may be provided the outside of the steering column or may be provided the inside of the steering column.

In the case that the impact energy absorbing mechanism is provided on the outside of the steering column as in Patent Document 1 (Korean Patent Application Publication No. 10-2020-0070086), it is easy to expand a crash stroke, but there is concern about interference with an external package when energy absorption occurs.

In the case that the impact energy absorbing mechanism is provided inside the steering column, there is no interference with the external package when absorbing the impact energy, but there is a disadvantage in that the crash stroke changes according to a teles position indicating a degree of protrusion of the steering wheel.

PRIOR ART DOCUMENT

Patent Document

Patent Document 1: Korean Patent Application Publication No. 10-2020-0070086 (published on Jun. 17, 2020)

SUMMARY

Example embodiments have been made in an effort to solve the above issue of the related art, and provide a steering column for an automotive vehicle in which an energy absorbing mechanism having a constant crash stroke regardless of a teles position while not interfering with an external package when absorbing an impact energy is included inside the steering column.

Further, example embodiments provide a steering column for an automotive vehicle including an energy absorbing mechanism for easy tuning of an impact load.

According to an aspect, there is provided a steering column for an automotive vehicle including an inner tube surrounding a steering shaft, an outer tube into which the inner tube is inserted, a nut screw mounted on the outside of the outer tube and fixed to the inner tube, and a first lead screw which is inserted into the nut screw and screwed therein and is rotated by a motor, and in the steering column for the automotive vehicle, the nut screw and the inner tube are transferred together by translational motion by rotation of the first lead screw.

Further, a slot plate may be fixed to an inner surface of the inner tube.

Further, an inner tube slot may be formed in the inner tube in an axial direction, and a slot may be formed in a portion corresponding to the inner tube slot in the slot plate.

Further, the nut screw may be fixed to the inner tube and the slot plate by a lead bolt passing through the inner tube slot and the slot of the slot plate.

Further, in the outer tube, an outer tube slot may be formed in a portion corresponding to the inner tube slot and the slot of the slot plate, and the lead bolt may pass through the outer tube slot and may be fixed to the nut screw.

Further, in a state where a washer is positioned between the lead bolt and the inner tube and a guide block is positioned under the washer, the lead bolt may be screwed to the guide block.

Further, the guide block may include a guide block upper body and a guide block lower body, a guide block hole may be formed in the guide block upper body, and the lead bolt may be screwed into the guide block hole.

Further, the guide block lower body may be formed with a width wider than a width of the slot of the slot plate, and may be positioned under the slot plate.

Further, the guide block upper body may protrude upward through the slot plate.

Further, the guide block upper body may be formed so that a width in a direction crossing the slot is wider than a width of the slot.

Further, a frictional restraining force may be formed with the washer and the inner tube by a bolt clamping force of the lead bolt and the guide block, and when a stow mode is operated, the lead bolt, the washer, and the inner tube may be translated together according to translational motion of the nut screw.

Further, when the automotive vehicle crashes to absorb an impact energy, in a state where the lead bolt, the washer, and the guide block restrained to the first lead screw are fixed, the impact energy may be absorbed as a relative displacement occurs between an outer surface of the guide block upper body of the guide block and the slot of the slot plate.

Further, a step may be formed between the washer and the inner tube.

According to example embodiments, a steering column has an effect of absorbing an impact energy without interfering with the external package during impact by assembling the slot plate on the inner surface of the inner tube.

Further, the steering column has a structure in which the crash stroke does not change regardless of the teles position of the steering column.

Furthermore, there is an effect of facilitating tuning of an energy absorbing load by changing various slot dimensions of the slot plate.

DETAILED DESCRIPTION

Hereinafter, a steering column for an automotive vehicle according to example embodiments will be described in detail with reference to FIGS. 1 to 9.

Figure 1:
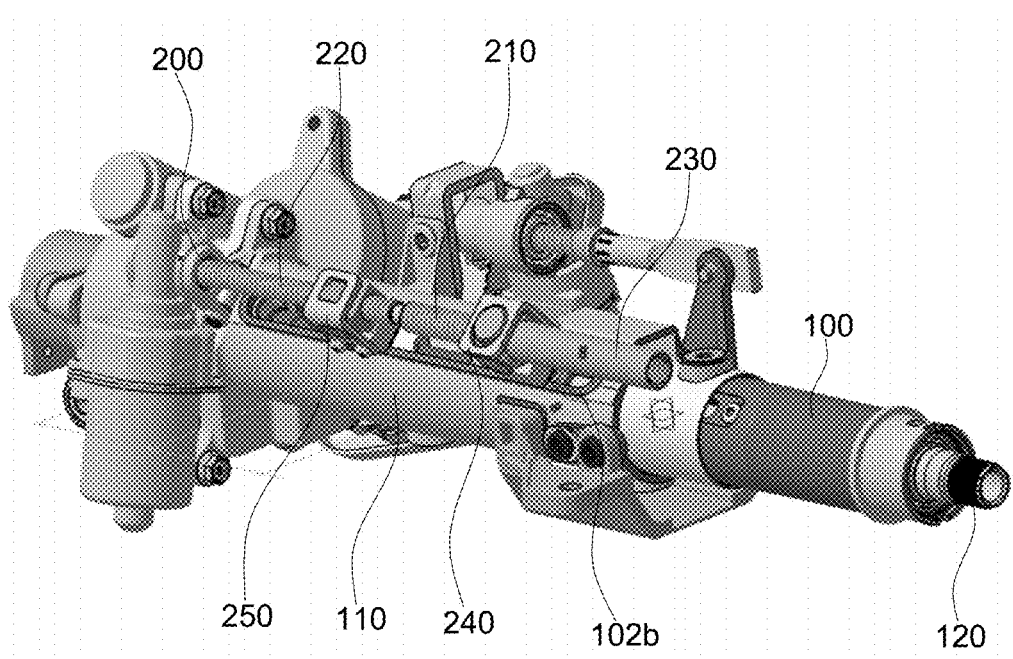
FIG. 1 is a schematic diagram illustrating a structure of a steering column for an automotive vehicle according to an example embodiment.
Figure 2:
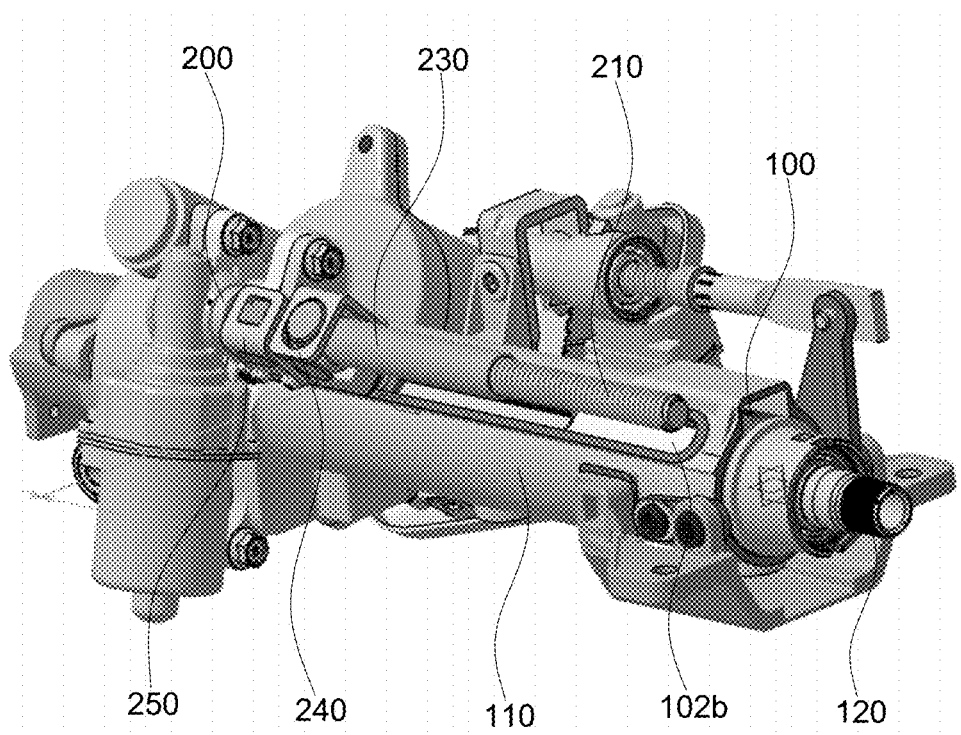
FIG. 2 is a diagram illustrating a state in which a steering column is contracted by a telescope function with a relative movement of an inner tube and an outer tube of the steering column of FIG. 1.

FIG. 1 illustrates a schematic structure of a steering column for an automotive vehicle according to an example embodiment, and FIG. 2 illustrates a state in which the steering column is contracted by a telescope function having a relative movement of an inner tube and an outer tube of the steering column of FIG. 1.

As described with reference to FIG. 1, the steering column for the automotive vehicle according to an example embodiment includes an inner tube 100 of a hollow tube which is formed an outside of a steering shaft 120 and surrounds the steering shaft 120 connected to a steering wheel, and an outer tube 110 having an inner diameter larger than an outer diameter of the inner tube 100 so that the inner tube 100 may be inserted therein. One end of the inner tube 100 is inserted into one end of the outer tube 110.

In the steering column, a driver may adjust a degree of protrusion and an inclination angle of the steering wheel to suit his/her height or body type. Exemplarily, in order to reduce the degree of protrusion of the steering wheel toward the driver, when stow mode is operated, a locking state of the steering column is released using an adjustment lever (not shown), and a state in which the steering column is contracted by the inner tube 100 performing translational motion in the outer tube 110 is illustrated in FIG. 2.

A nut screw 230 and a first lead screw 210 that enable an axial direction movement of the inner tube 100 are mounted the outside of the steering column. The nut screw 230 is fixed to the inner tube 100 by a lead bolt 103 (see FIG. 6) via a first fixing block 240 (see FIG. 6). The lead bolt 103 is screwed to a guide block 105 passing through a slot formed in the inner tube 100 and the outer tube 110 and mounted on an inner surface of the inner tube 100 (see FIGS. 3 and 4). As a result, the lead bolt 103 is fixed to the inner tube 100.

The nut screw 230 is coupled to the first lead screw 210 which is inserted into the nut screw 230 and screwed therein. The first lead screw 210 is connected to a second lead screw 220, and the second lead screw 220 is connected to a speed reducer 200. The second lead screw 220 performs a rotational motion through the speed reducer 200 by a rotational force of a motor, and the first lead screw 210 connected thereto rotates and the nut screw 230 which is screwed thereto performs translational motion in the direction toward the speed reducer 200. As the nut screw 230 performs the translational motion, the inner tube 100 which is fixed thereto is transferred together by the translational motion with the nut screw 230.

A specific nut is screwed to the outside of the second lead screw 220, and the specific nut is fixed to a second fixing block 250. The second fixing block 250 is fixed to a separate intermediate tube (not shown in the drawings) which is coupled to the inner tube 100 in the axial direction inside the outer tube 110. Accordingly, when the second lead screw 220 is rotated by the speed reducer, the intermediate tube and the inner tube 100 fixed thereto are simultaneously transferred.

The second lead screw 220 may have one thread, and the first lead screw 210 may have two threads and have a lead twice as long as that of the second lead screw 220. In this way, a transport distance of the nut screw 230 may be doubled compared to a transport distance of the second fixing block 250 by the rotational force of the motor.

Hereinafter, a steering column structure for impact energy absorption in an automotive crash will be described with reference to FIGS. 3 to 7.

Figure 3:
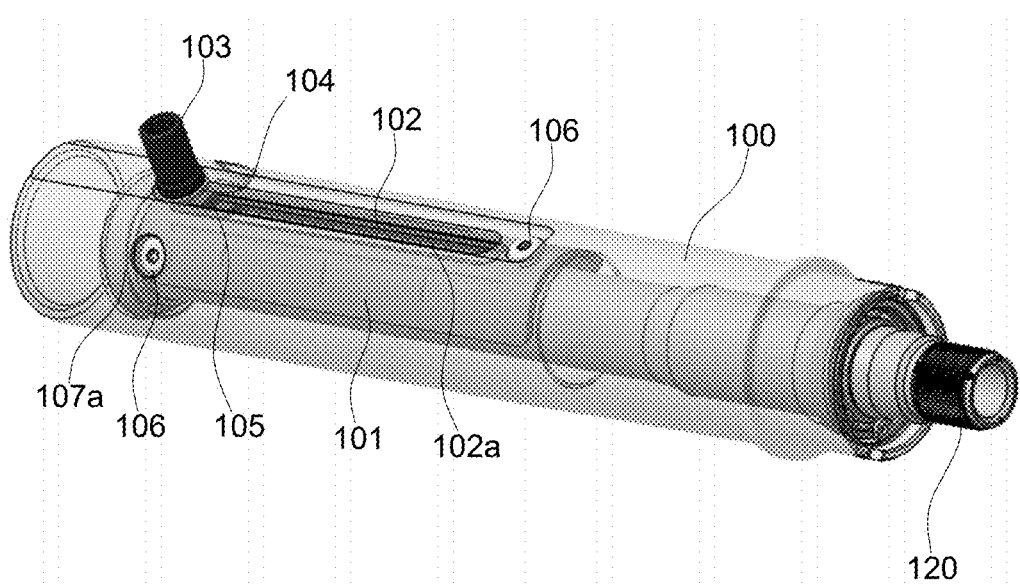
FIG. 3 is a diagram illustrating a state in which a slot plate is mounted on an inner surface of an inner tube of a steering column according to an example embodiment.
Figure 4:
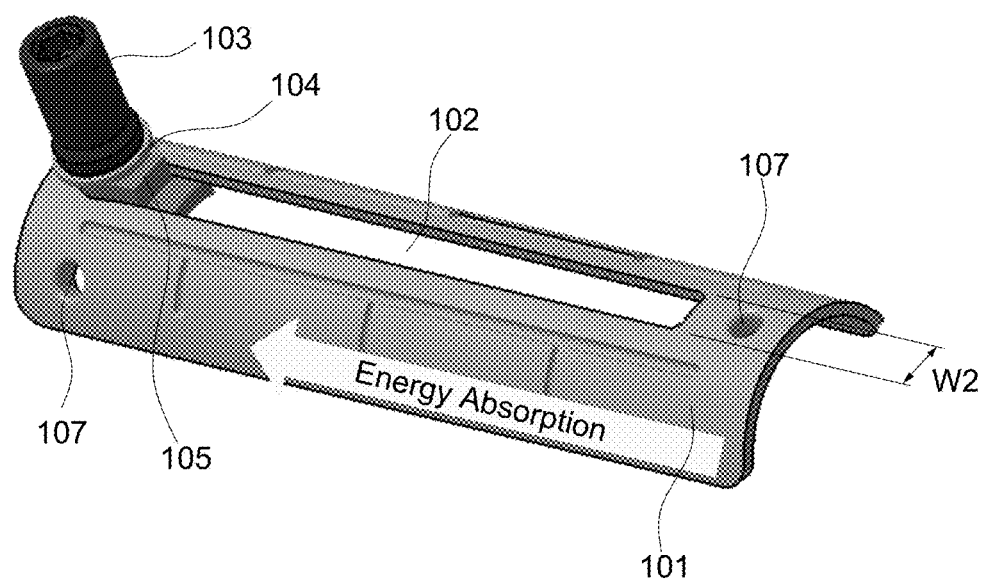
FIG. 4 is a diagram illustrating the slot plate of FIG. 3 and its related components.
Figure 5:
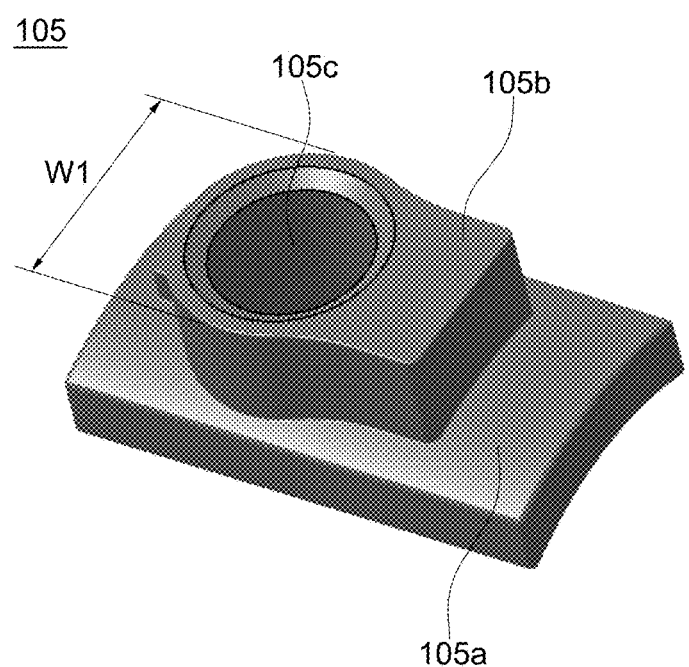
FIG. 5 is a diagram illustrating a structure of a guide block mounted on a slot of the slot plate of FIG. 3.

FIG. 3 illustrates a state in which a slot plate is mounted on an inner surface of an inner tube of the steering column according to an example embodiment, FIG. 4 illustrateds the slot plate of FIG. 3 and related components, and FIG. 5 illustrates structure of a guide block mounted in a slot of the slot plate of FIG. 3.

First, descriptions will be provided with reference to FIGS. 3 and 4. The steering shaft 120 is built-in inside the inner tube 100 formed of a hollow tube, and a slot plate 101 is fixed to an inner surface of the inner tube 100 by a plurality of bolts 106. A slot 102 is formed in the slot plate 101 by a predetermined distance. In the inner tube 100 corresponding to the slot 102 of the slot plate 101, an inner tube slot 102a similar thereto is formed. Since a plurality of screw holes 107 are formed in the slot plate 101, and a plurality of inner tube holes 107a are formed at positions corresponding of the inner tube 100, the plurality of bolts 106 pass through the inner tube holes 107a and the screw holes 107 and are screwed, so that the slot plate 101 is fixed to the inner surface of the inner tube 100. In addition, in the outer tube 110, an outer tube slot 102b (see FIGS. 1 and 2) is formed at positions corresponding to the slot plate 101, the slot 102 and the inner tube slot 102a.

Figure 6:
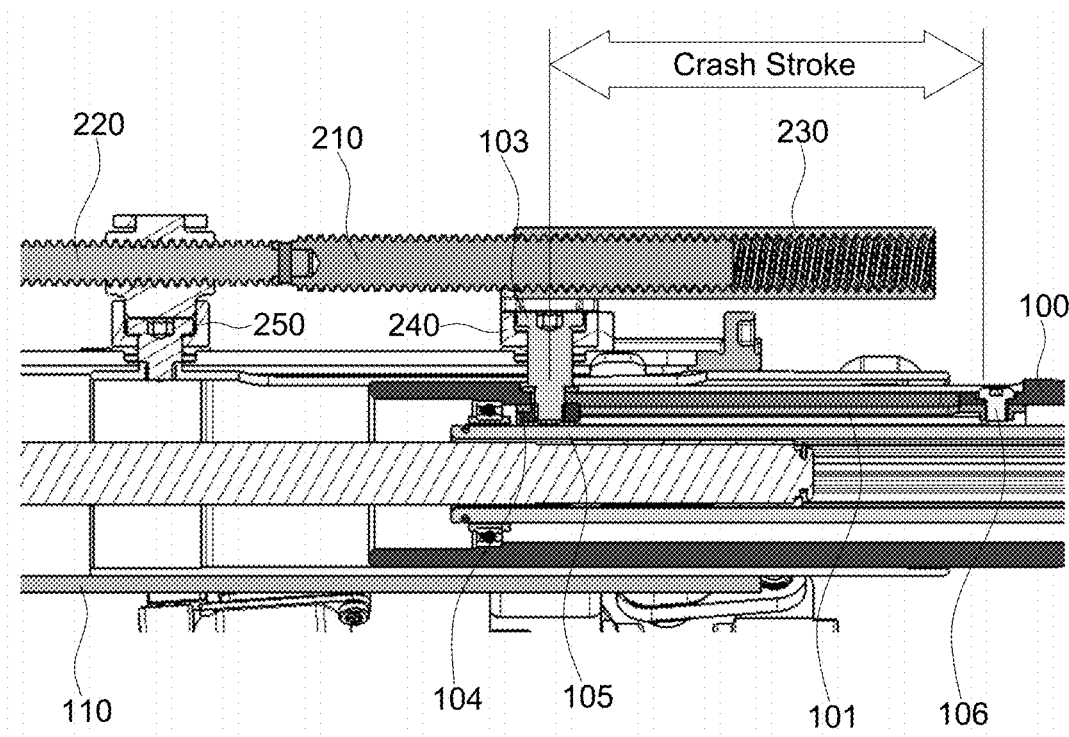
FIG. 6 is a cross-sectional view illustrating an internal structure of the steering column of FIGS. 1 and 2.

In addition, referring to FIG. 6, the nut screw 230 is fixed to the inner tube 100 and the slot plate 101 by an outer tube slot 102b, the inner tube slot 102a, and the lead bolt 103 passing through the slot 102 of the slot plate 101 via the first fixing block 240 fixed to the outside of the nut screw.

Referring to FIGS. 3 to 6, in a state where a washer 104 is positioned between the lead bolt 103 and the inner tube 100, and the guide block 105 is positioned directly under the washer 104, the lead bolt 103 is screwed to the guide block 105. The guide block 105 includes a guide block upper body 105b and a guide block lower body 105a. A guide block hole 105c is formed in the guide block upper body 105b, so that the lead bolt 103 is screwed into the guide block hole 105c. The guide block lower body 105a is formed with a width wider than a width of the slot 102 of the slot plate 101, and thus the guide block upper body 105b penetrates the slot plate 101 and protrudes upward, but the guide block lower body 105a is coupled by the lead bolt 103 in a state positioned under the slot plate 101.

As described above, the slot plate 101 is assembled on the inner surface of the inner tube 100 to form a mechanism for absorbing an impact energy when the automotive vehicle crashes, and since the energy absorbing mechanism is formed on the inner surface of the inner tube 100, interference with a package outside of the steering column may be avoided during an energy absorption operation by the automotive crash. Further, by forming an impact energy absorbing structure using an inner space of the steering column, there is no need to secure a separate space for impact energy absorption outside the steering column, which makes the structure compact.

Figure 7:
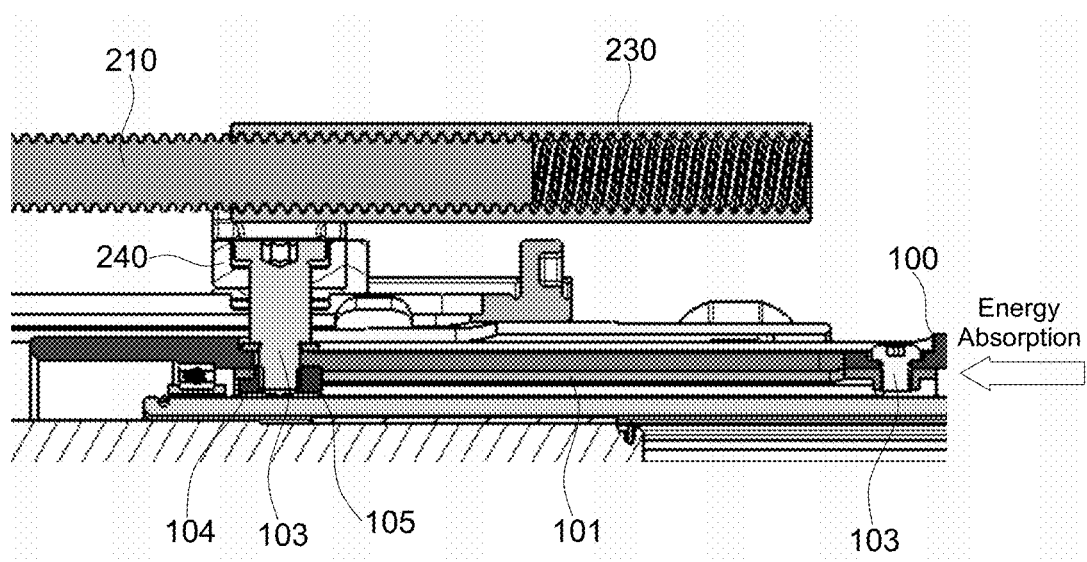
FIG. 7 is a partially enlarged view of the cross-sectional view of FIG. 6 to illustrate components involved when an impact energy is absorbed.

Referring to FIGS. 6 and 7, how a steering column operates during the stow mode operation and automotive crash energy absorbing load operation will be described. FIG. 6 is a cross-sectional view illustrating an internal structure of the steering column of FIGS. 1 and 2, and FIG. 7 is a partially enlarged view of the cross-sectional view of FIG. 6 to illustrate components involved when an impact energy is absorbed.

The stow mode operation will be described first. By rotation of the first lead screw 210, the lead bolt 103 restrained with the nut screw 230 perform translational motion. The washer 104 and parts of the inner tube 100 have a frictional restraining force by a bolt clamping force of the lead bolt 103 and the guide block 105, and when the stow mode is operated, the parts perform translational motion together.

In the case that an automotive vehicle crashes and absorbs an impact energy, an energy absorbing load operation will be described. An impact load is generated in the left direction in FIGS. 6 and 7 on the inner tube 100 and the slot plate 101 assembled by the plurality of bolts 106. At this time, the lead bolt 103, the washer 104, and the guide block 105 restrained to the first lead screw 210 are fixed without moving. The impact energy is absorbed as a relative displacement occurs between an outer surface of the guide block upper body 105b of the fixed guide block 105 and the slot 102 of the slot plate 101. To this end, the guide block upper body 105b is formed so that a width W1 in a direction crossing the slot 102 is wider than a width W2 of the slot 102.

The relative displacement between the guide block 105 and the slot 102 of the slot plate 101 as above occurs while overcoming load due to resistance existing therebetween, and by variously changing the dimension of the slot 102 of the slot plate 101, it is possible to facilitate tuning of an energy absorbing load.

Figure 8:
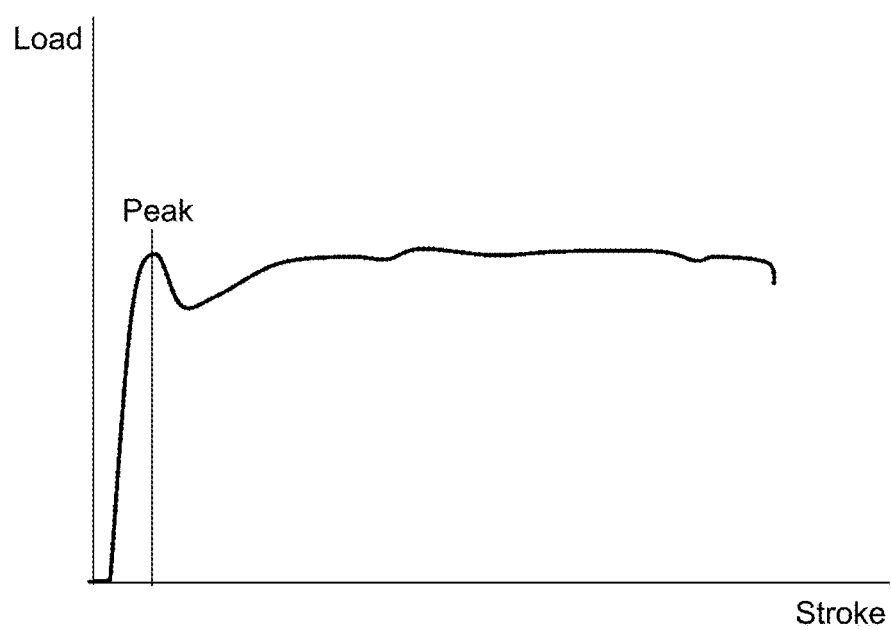
FIG. 8 is a graph illustrating a load change according to impact stroke when an impact energy is absorbed.

FIG. 8 illustrates a change in load according to displacement or impact stroke that occurs during an automotive crash. At the beginning, the load abruptly increases then a peak appears, and after that, the load decreases. As the guide block 105 proceeds along the slot 102 of the slot plate 101, a running load which gradually increases and then becomes constant is formed. Here, since the impact stroke is determined by a length of the slot 102 of the slot plate 101, it does not change even if the inner tube 100 is transported to be contracted in the stow mode.

An initial peak load is formed by a frictional restraining force between the washer 104 and parts of the inner tube 100 according to the bolt clamping force of the lead bolt 103 and the guide block 105. On the other hand, the running load is formed by a resistive force according to a thickness of the slot plate 101 and a width dimension of the slot 102. Accordingly, the initial peak load may be adjusted by a clamping force of the lead bolt 103, and the running load may be adjusted by the thickness of the slot plate 101 and the width dimension of the slot 102.

Figure 9:
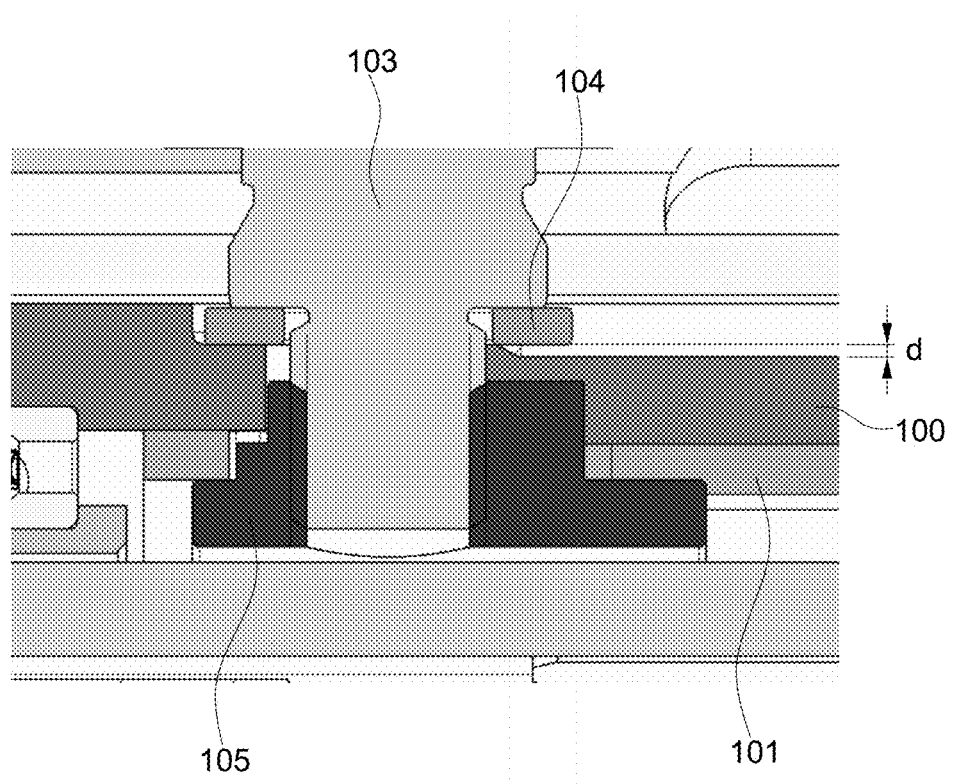
FIG. 9 is a diagram illustrating structure of an inner tube and a washer in a coupling relationship with a slot plate.

FIG. 9 illustrates structure of an inner tube and a washer in a coupling relationship with a slot plate. A step d may be formed between the washer 104 and a running surface of the inner tube 100. By forming the step d in this way, it is possible to release a friction force between the washer 104 and the inner tube 100 when a running load section starts past a peak load. The running load may also be adjusted by the step d.

The above description is merely illustrative of the technical spirit of the present disclosure, and various modifications and variations would be possible without departing from the essential characteristics of the present disclosure by those skilled in the art to which the present disclosure pertains. Therefore, the example embodiments disclosed in the present disclosure are intended to explain, not to limit the technical spirit of the invention, but to explain it, and the scope of technical ideas of the invention is not limited by these example embodiments. The protection scope of the present disclosure should be construed by the appended claims, and all technical ideas within the scope equivalent thereto should be construed as being included in the scope of the present disclosure.

EXPLANATION OF REFERENCE NUMERALS

100: Inner tube
101: Slot plate
102: Slot
102a: Inner tube slot
103: Lead bolt
104: Washer
105: Guide block
105a: Guide block lower body
105b: Guide block upper body
105c: Guide block hole 106: Bolt
107: Screw hole
107a: Inner tube hole
110: Outer tube
120: Steering shaft
200: Speed reducer
210: First lead screw
220: Second lead screw
230: Nut screw
240: First fixing block
250: Second fixing block

What is claimed is:

1. A steering column for an automotive vehicle comprising:
    an inner tube surrounding a steering shaft;
    an outer tube into which the inner tube is inserted;
    a nut screw mounted on an outside of the outer tube and fixed to the inner tube; and
    a first lead screw inserted into the nut screw and screwed in the nut screw, the first lead screw configured to be rotatable by a motor,
    wherein the nut screw and the inner tube are configured to be linearly translatable together by rotation of the first lead screw,
    wherein a slot plate is fixed to an inner surface of the inner tube.

2. The steering column of claim 1, wherein an inner tube slot is formed in the inner tube in an axial direction, and
    in the slot plate, a slot is formed in a portion corresponding to the inner tube slot.

3. The steering column of claim 2, wherein the nut screw is fixed to the inner tube and the slot plate by a lead bolt passing through the inner tube slot and the slot of the slot plate.

4. The steering column of claim 3, wherein in the outer tube, an outer tube slot is formed in a portion corresponding to the inner tube slot and the slot of the slot plate, and the lead bolt passes through the outer tube slot and is fixed to the nut screw.

5. The steering column of claim 3, wherein, in a state where a washer is positioned between the lead bolt and the inner tube and a guide block is positioned under the washer, the lead bolt is screwed to the guide block.

6. The steering column of claim 5, wherein the guide block comprises a guide block upper body and a guide block lower body,
    a guide block hole is formed in the guide block upper body, and
    the lead bolt is screwed into the guide block hole.

7. The steering column of claim 6, wherein the guide block lower body is formed with a width wider than a width of the slot of the slot plate, and positioned under the slot plate.

8. The steering column of claim 7, wherein the guide block upper body protrudes upward through the slot plate.

9. The steering column of claim 8, wherein the guide block upper body is formed so that a width in a direction crossing the slot is wider than a width of the slot.

10. The steering column of claim 9, wherein a frictional restraining force is formed with the washer and the inner tube by a bolt clamping force of the lead bolt and the guide block, and
    when a stow mode is operated, the lead bolt, the washer, and the inner tube are translated together according to the translational motion of the nut screw.

11. The steering column of claim 10, wherein, when the automotive vehicle crashes to absorb an impact energy, in a state where the lead bolt, the washer, and the guide block restrained to the first lead screw are fixed, the impact energy is absorbed as a relative displacement occurs between an outer surface of the guide block upper body of the guide block and the slot of the slot plate.

12. The steering column of claim 11, wherein a step is formed between the washer and the inner tube.

* * * * *